United States Patent
Onishi et al.

(10) Patent No.: US 10,814,915 B2
(45) Date of Patent: Oct. 27, 2020

(54) VEHICLE CENTER PILLAR

(71) Applicant: Toyota Jidosha Kabushiki Kaisha, Toyota-shi, Aichi-ken (JP)

(72) Inventors: Yukihiro Onishi, Kariya (JP); Naoto Taniyama, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/291,227

(22) Filed: Mar. 4, 2019

(65) Prior Publication Data

US 2019/0276088 A1 Sep. 12, 2019

(30) Foreign Application Priority Data

Mar. 6, 2018 (JP) ................................ 2018-039647

(51) Int. Cl.
*B62D 25/04* (2006.01)
*B62D 21/15* (2006.01)

(52) U.S. Cl.
CPC ............ *B62D 25/04* (2013.01); *B62D 21/157* (2013.01)

(58) Field of Classification Search
CPC ...... B62D 25/04; B62D 25/08; B62D 25/082; B62D 25/085; B62D 25/087; B62D 21/15; B62D 21/152; B62D 21/155; B62D 21/157
USPC .................................................... 296/193.06
See application file for complete search history.

(56) References Cited

U.S. PATENT DOCUMENTS

| | | | |
|---|---|---|---|
| 2006/0208537 A1* | 9/2006 | Dingman | B62D 25/04 296/193.05 |
| 2008/0036235 A1* | 2/2008 | Ameloot | B62D 25/04 296/102 |
| 2010/0244492 A1* | 9/2010 | Itakura | B62D 25/04 296/193.06 |
| 2013/0187409 A1* | 7/2013 | Moll | B62D 25/04 296/193.06 |
| 2016/0257348 A1* | 9/2016 | Balur | B62D 27/02 |
| 2016/0355214 A1* | 12/2016 | Irie | B62D 21/157 |
| 2017/0101133 A1* | 4/2017 | Emura | B60J 5/047 |

(Continued)

FOREIGN PATENT DOCUMENTS

| | | |
|---|---|---|
| JP | 2011218897 A | 11/2011 |
| JP | 2013184508 A | 9/2013 |

(Continued)

*Primary Examiner* — Gregory A Blankenship
(74) *Attorney, Agent, or Firm* — Dinsmore & Shohl LLP

(57) ABSTRACT

A center pillar includes: an outer panel located outward in a vehicle-width direction; and an inner panel located inward of the outer panel in a vehicle-width direction, and forming a closed section, wherein the inner panel includes an installation opening formed in a lower end portion in a vehicle-height direction of the inner panel, a predetermined component being housed in the closed section via the installation opening, a pair of longitudinally long bead portions formed at both side edges of the inner panel so as to extend in the vehicle-height direction from an upper end portion to a peripheral edge of the installation opening, and a reinforcing coupling bead portion formed at a position above and near the installation opening in the vehicle-height direction, the reinforcing coupling bead portion coupling the pair of longitudinally long bead portions along the vehicle front-rear direction.

3 Claims, 5 Drawing Sheets

(56) References Cited

U.S. PATENT DOCUMENTS

| | | | |
|---|---|---|---|
| 2018/0065680 A1* | 3/2018 | Kamimura | B62D 25/04 |
| 2019/0009825 A1* | 1/2019 | Marukawa | B62D 25/04 |
| 2019/0276088 A1* | 9/2019 | Onishi | B62D 25/04 |
| 2019/0283805 A1* | 9/2019 | Kurokawa | B62D 29/043 |
| 2020/0102016 A1* | 4/2020 | Hoshuyama | B62D 21/157 |

FOREIGN PATENT DOCUMENTS

| | | |
|---|---|---|
| JP | 2015058798 A | 3/2015 |
| JP | 2018-001841 A | 1/2018 |

* cited by examiner

VEHICLE CENTER PILLAR

CROSS-REFERENCE TO RELATED APPLICATIONS

This application claims priority to Japanese Patent Application No. 2018-039647 filed on Mar. 6, 2018, which is incorporated herein by reference in its entirety including the specification, drawings and abstract.

BACKGROUND

1. Technical Field

The present disclosure relates to a vehicle center pillar.

2. Description of Related Art

There have been proposed various techniques regarding vehicle center pillars disposed to extend in the height direction at lateral parts of vehicles. For example, in a vehicle structural body described in the following Japanese Patent Application Publication No. 2011-218897 (JP 2011-218897 A), a center pillar configuring a vehicle body is provided with a conducting opening used for conducting a wire harness to the outside at a middle position in the longitudinal direction of a pillar inner; and there is provided, at an edge of the conducting opening, a projecting portion that is recessed from the inner side toward the outer side of the vehicle. An installation opening used for installing a component such as a seatbelt retractor is provided in a lower portion in the longitudinal direction of the pillar inner; and a projecting portion recessed from the inner side toward the outer side of the vehicle is provided at an edge of the attachment opening. Each projecting portion is configured to be provided along the longitudinal direction of a structural member.

SUMMARY

In the vehicle structural body described in JP 2011-218897 A, at the time of a roof crush and a lateral collision of the vehicle, or the like, when a great load is applied from the lateral side of the vehicle body, a peripheral edge portion of each opening of the pillar inner can be deformed toward the outer side of a vehicle cabin so as to suppress such deformation that reduces a space inside the vehicle cabin. However, recently, a further higher performance has been requested in a roof crush resistance, and when a center pillar is caused to be deformed toward the inner side of the vehicle cabin with a further higher load, there is a risk that the peripheral edge portion of the installation opening used for installing a seatbelt retractor or the like might be deformed toward the inner side of the vehicle cabin due to a cross-sectional collapse at a lower end portion in the longitudinal direction. Consequently, it might be affected to the closed section in which the seatbelt retractor or the like is disposed.

The present disclosure provides a vehicle center pillar capable of suppressing a cross-sectional collapse in a closed section in which a seatbelt retractor or the like is disposed.

A center pillar includes: an outer panel being elongated, located outward in a vehicle-width direction and having a hat-like sectional shape; and an inner panel being elongated, located inward of the outer panel in a vehicle-width direction, and having second flange portions bent outward from both side edges of the inner panel, the second flange portions being joined, by welding, to first flange portions bent outward in a vehicle front-rear direction from both side edges of the outer panel so as to form a closed section, wherein the inner panel includes an installation opening formed in a lower end portion in a vehicle-height direction of the inner panel, a predetermined component being housed in the closed section via the installation opening, a pair of longitudinally long bead portions formed at the both side edges of the inner panel so as to extend in the vehicle-height direction from an upper end portion in the vehicle-height direction of the inner panel to a peripheral edge of the installation opening, and a reinforcing coupling bead portion formed at a position above and near the installation opening in the vehicle-height direction, the reinforcing coupling bead portion coupling the pair of longitudinally long bead portions along the vehicle front-rear direction.

According to the above aspect, at a position above and near the installation opening formed in the lower end portion in the vehicle-height direction of the inner panel, there is provided the reinforcing coupling bead portion that couples the pair of longitudinally long bead portions formed at the both side edges, along the vehicle front-rear direction. Therefore, for the request for a further higher roof crush resistance performance, it is possible to suppress the cross-sectional collapse in the closed section in which a predetermined component such as a seatbelt retractor is disposed via the installation opening, to thereby enhance the roof crush resistance performance with a simple structure. In addition, since the reinforcing coupling bead portion is formed at a position above and near the installation opening, it is possible to avoid stress concentration at the time of a roof crush and a lateral collision of the vehicle, and thus it is possible to suppress the vehicle center pillar from being bent and broken at a position where the reinforcing coupling bead portion is formed.

In the above aspect, the pair of longitudinally long bead portions and the reinforcing coupling bead portion may project in the same direction in the vehicle-width direction.

According to the above aspect, since both of the longitudinally long bead portions and the reinforcing coupling bead portion project in the same direction in the vehicle-width direction, it is possible to easily form these bead portions by press working, thus attaining reduction in manufacturing cost.

In the above aspect, a plurality of the reinforcing coupling bead portions may be provided alongside each other in the vehicle-height direction.

According to the above aspect, since the plurality of reinforcing coupling bead portions are arranged alongside each other in the vehicle-height direction, it is possible to further suppress the cross-sectional collapse in the closed section in which the predetermined component such as a seatbelt retractor is disposed via the installation opening, to thereby enhance the roof crush resistance performance with a simple structure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle center pillar according to the present disclosure will be described in detail based on one embodiment in which the vehicle center pillar is embodied, with reference to the drawings. Description will be started with a schematic configuration of a vehicle center pillar 1 with reference to FIG. 1 to FIG. 4. Note that, as appropriately shown in each drawing, an arrow FR indicates a vehicle frontward direction, and an arrow UP indicates a vehicle upward direction. Furthermore, an arrow IN indicates an inward direction in the vehicle width direction. In the following explanation, description regarding directions will be made with reference to the above directions.

Figure 1:
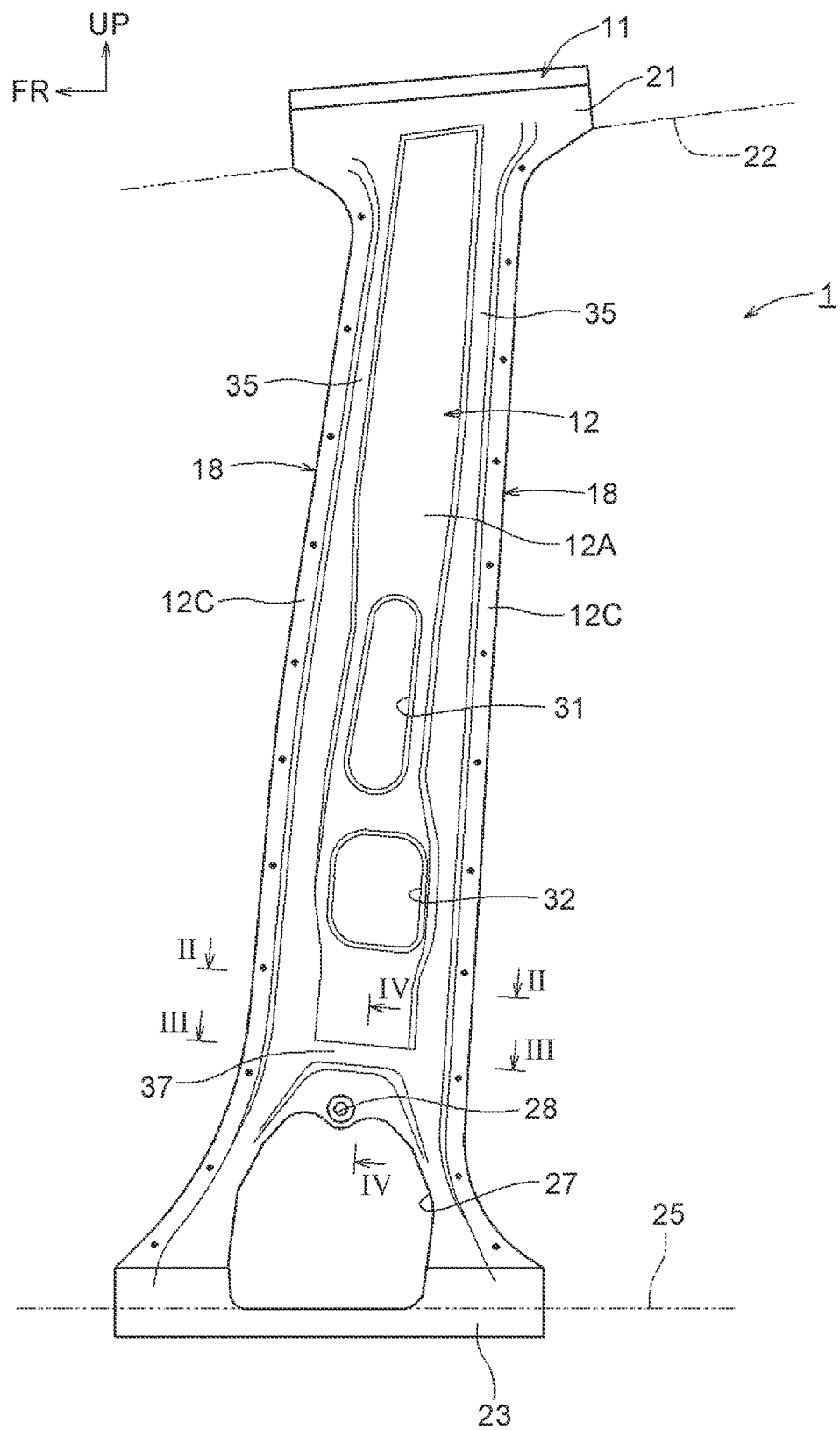
FIG. 1 is a front view of a vehicle center pillar according to the present embodiment, as viewed from an inner side of the vehicle.
Figure 2:
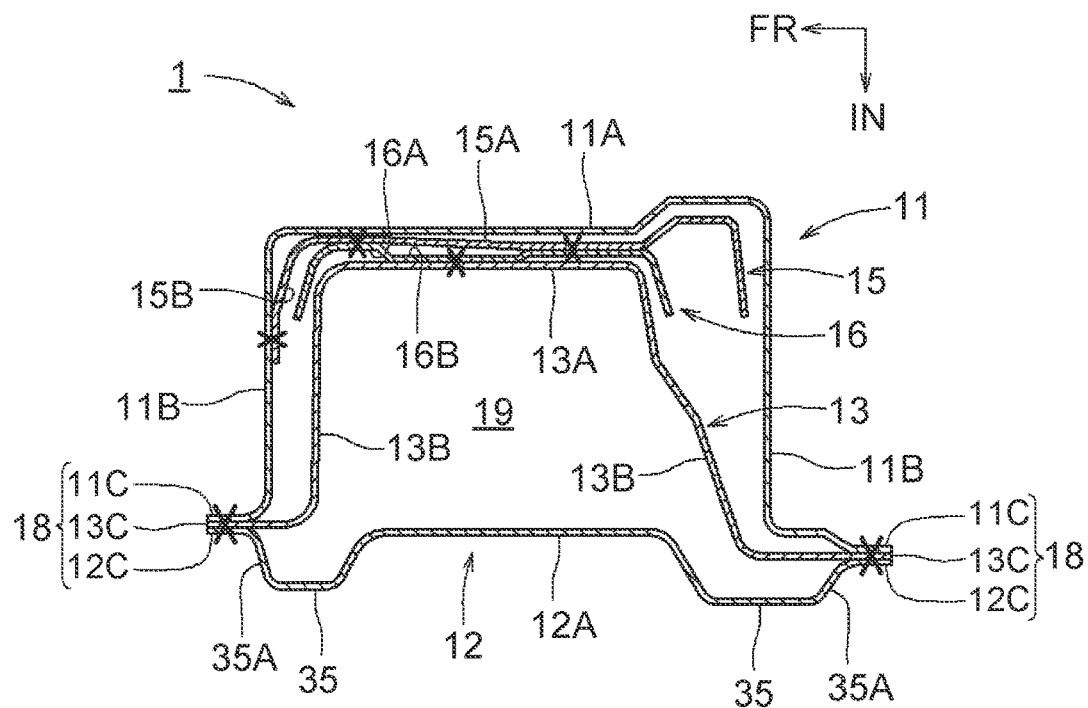
FIG. 2 is a sectional view taken along line II-II of FIG. 1.

As shown in FIG. 1 and FIG. 2, the vehicle center pillar 1 includes: an elongated outer panel 11 configuring an outer part in the vehicle-width direction of the vehicle center pillar 1; an elongated inner panel 12 configuring an inner part in the vehicle-width direction of the vehicle center pillar 1; an elongated pillar reinforcement 13 arranged along an inner side of the outer panel 11; an elongated first reinforcement 15 disposed between the outer panel 11 and the pillar reinforcement 13; and an elongated second reinforcement 16 disposed between the first reinforcement 15 and the pillar reinforcement 13.

The outer panel 11 is formed to have a hat-like sectional shape opening toward the inner side in the vehicle-width direction, and includes: first flange portions 11C arranged in pair at both side edges in a vehicle front-rear direction on the opening side and extending in the vehicle front-rear direction; a pair of first longitudinal wall portions 11B disposed between the pair of first flange portions 11C and extending upright from the respective first flange portions 11C, outward in the vehicle-width direction; and a first bottom wall portion 11A connecting respective outer ends in the vehicle-width direction of the first longitudinal wall portions 11B. The inner panel 12 includes: second flange portions 12C disposed at both side edges in the vehicle front-rear direction and extending in the vehicle front-rear direction; and a base wall portion 12A of which both ends in the vehicle front-rear direction are connected to the respective second flange portions 12C.

In addition, the pillar reinforcement 13 is arranged inward of the outer panel 11 and extending along the longitudinal direction, and is formed to have a hat-like sectional shape opening toward the inner side in the vehicle-width direction. The pillar reinforcement 13 includes: third flange portions 13C arranged in pair at both side edges in the vehicle front-rear direction on the opening side and extending in the vehicle front-rear direction; a pair of third longitudinal wall portions 13B disposed between the pair of third flange portions 13C and extending upright from the respective third flange portions outward in the vehicle-width direction; and a third bottom wall portion 13A connecting respective outer ends in the vehicle-width direction of the third longitudinal wall portions 13B.

Figure 3:
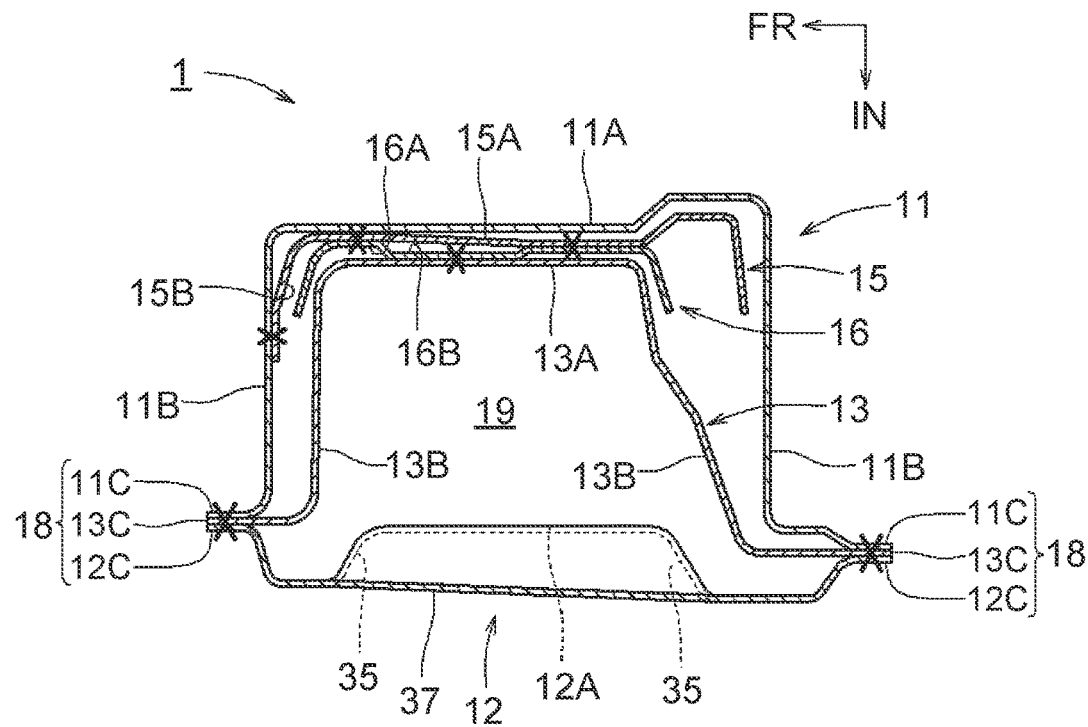
FIG. 3 is a sectional view taken along line III-III of FIG. 1.

Each of the second flange portions 12C of the inner panel 12 overlaps each of the first flange portions 11C of the outer panel 11 in the vehicle-width direction with each third flange portion 13C of the pillar reinforcement 13 interposed therebetween, and these flange portions are welded by spot-welding so as to be formed into each of flange joint portions 18 in pair, to thereby form a closed section 19. In FIG. 1, welding spots are indicated by black dots. In FIG. 2 and FIG. 3, welding spots are indicated by x marks. The welding is not limited to spot-welding, and another welding, such as laser welding, may also be employed.

In addition, the first reinforcement 15 is formed to have a generally shallow U-shaped section opening toward the inner side in the vehicle-width direction, and a side wall portion 15B located on the front side in the vehicle front-rear direction is in contact with an inner surface of the first longitudinal wall portion 11B extending outward and upright from the first flange portion 11C located on the front side in the vehicle front-rear direction of the outer panel 11, and is welded to the inner surface of the first longitudinal wall portion 11B by the spot welding. A second reinforcement 16 is formed to have a generally shallow U-shaped section opening toward the inner side in the vehicle-width direction, and a projection 16B projecting toward the inner side in the vehicle-width direction is formed at the center in the vehicle front-rear direction of a bottom wall portion 16A.

The bottom wall portion 16A of the second reinforcement 16 is in contact with an inner surface of a bottom wall portion 15A of the first reinforcement 15, and is joined thereto by spot welding using laser welding. The projection 16B of the second reinforcement 16 is brought to be in contact with the outer surface of the bottom wall portion 13A of the pillar reinforcement 13, and is joined thereto by spot welding using laser welding.

Hence, the elongated vehicle center pillar 1 is formed in a closed sectional structure extending in the vehicle-height direction so as to form a single closed space thereinside. The vehicle center pillar 1 is joined to a roof side rail 22 via a generally T-shaped attachment portion 21 formed to an upper end of the outer panel 11, and is joined to a side sill 25 via an attachment portion 23, in a generally T-shape in front view, formed to lower ends of the outer panel 11 and the inner panel 12 in such a manner as to be arranged along the vehicle-height direction.

Each of the outer panel 11, the pillar reinforcement 13, the first reinforcement 15, and the second reinforcement 16 is a steel sheet member formed by normal-temperature pressing or hot-stamping of a high tensile strength steel sheet having a tensile strength of 980 MPa or more (e.g. 1180 MPa).

The inner panel 12 is a steel sheet member formed by normal-temperature pressing of a high tensile strength steel sheet having a smaller tensile strength (e.g. 590 MPa) than a tensile strength of the outer panel 11. As shown in FIG. 1, the base wall portion 12A of the inner panel 12 is formed along the vehicle-height direction and the vehicle front-rear direction. This base wall portion 12A is formed to have a width in the vehicle front-rear direction that is substantially constant in the vehicle-height direction, and also to have a width in the vehicle front-rear direction that is gradually wider toward the lower end, on the lower end side in the vehicle-height direction.

An installation opening 27, in a generally rectangular shape in front view, used for installing a component such as a seatbelt retractor in the closed section 19 of the vehicle center pillar 1, is formed at a lower end in the vehicle-height direction of the base wall portion 12A. A bolt hole 28 is formed in an edge portion above the installation opening 27 in the vehicle-height direction, at a substantially center position in the vehicle front-rear direction. A nut used for fixing a not-illustrated component such as a seatbelt retractor is fixed to the back of the bolt hole 28 by welding or the like, and bolting is thus feasible. Between a substantially center position (belt line) in the vehicle-height direction of the base wall portion 12A and the installation opening 27, there are formed beads 31, 32 for enhancing rigidity of the vehicle center pillar 1.

A pair of longitudinally long bead portions 35, each having a substantially U-shaped section and projecting inward in the vehicle-width direction, is formed at both side edges in the vehicle front-rear direction of the base wall portion 12A, extending from upper ends to lower ends in the vehicle-height direction of the both side edges. The pair of second flange portions 12C are formed as joint portions bent outward in the vehicle front-rear direction from respective front end edges of second longitudinal wall portions 35A located outward in the vehicle front-rear direction of the pair of the longitudinally long bead portions 35.

Figure 4:
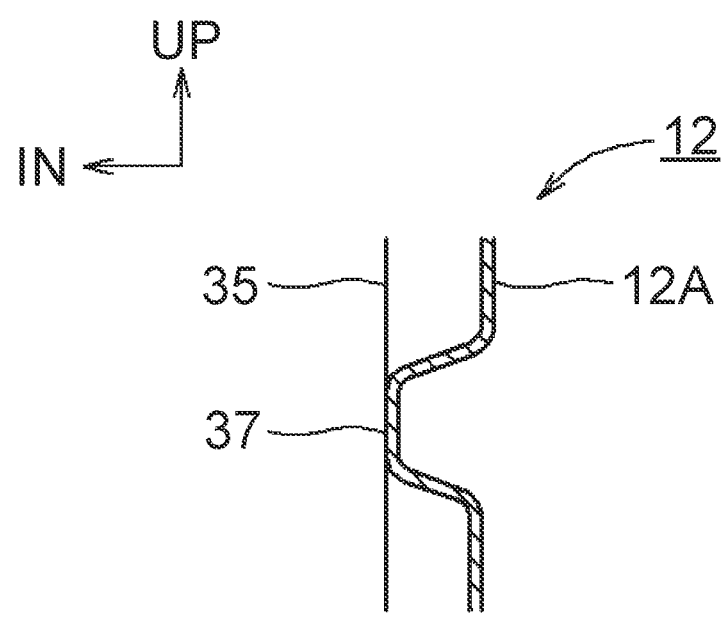
FIG. 4 is a sectional view taken along line IV-IV of FIG. 1.

As shown in FIG. 1, FIG. 3 and FIG. 4, at a position above and near the installation opening 27 in the vehicle-height direction, there is formed a reinforcing coupling bead portion 37, which couples the pair of longitudinally long bead portions 35 along the vehicle front-rear direction, projects inward in the vehicle-width direction. In some embodiments, the reinforcing coupling bead portion 37 is formed at a position lower than the belt line in the vehicle-height direction, and also as close as possible to the installation opening 27. Accordingly, the reinforcing coupling bead portion 37 can be arranged at a position not to become a breakage starting point of breakage due to stress concentration at the time of a roof crush and a lateral collision of the vehicle.

In some embodiments, a projecting height of the reinforcing coupling bead portion 37 relative to the base wall portion 12A located between the pair of longitudinally long bead portions 35 is substantially the same as a projecting height of the pair of longitudinally long bead portions 35 projecting from the base wall portion 12A located between the pair of longitudinally long bead portions 35. In addition, both of the reinforcing coupling bead portion 37 and the pair of longitudinally long bead portions 35 project toward the inner side in the vehicle-width direction in the same manner. If the pair of longitudinally long bead portions 35 project outward in the vehicle-width direction, it may be configured that the reinforcing coupling bead portion 37 projects outward in the vehicle-width direction at the same projecting height as the projecting heights of the longitudinally long bead portions 35.

This configuration can suppress ridges from being formed between the pair of longitudinally long bead portions 35 and the both ends in the vehicle front-rear direction of the reinforcing coupling bead portion 37, and at the time of a roof crush and a lateral collision of the vehicle, this configuration can also suppress stress concentration on the both ends in the vehicle front-rear direction of the reinforcing coupling bead portion 37. In addition, it is possible to facilitate formation of the pair of longitudinally long bead portions 35 and the reinforcing coupling bead portion 37 of the inner panel 12 by press working, to thereby attain reduction in manufacturing cost.

Figure 5:
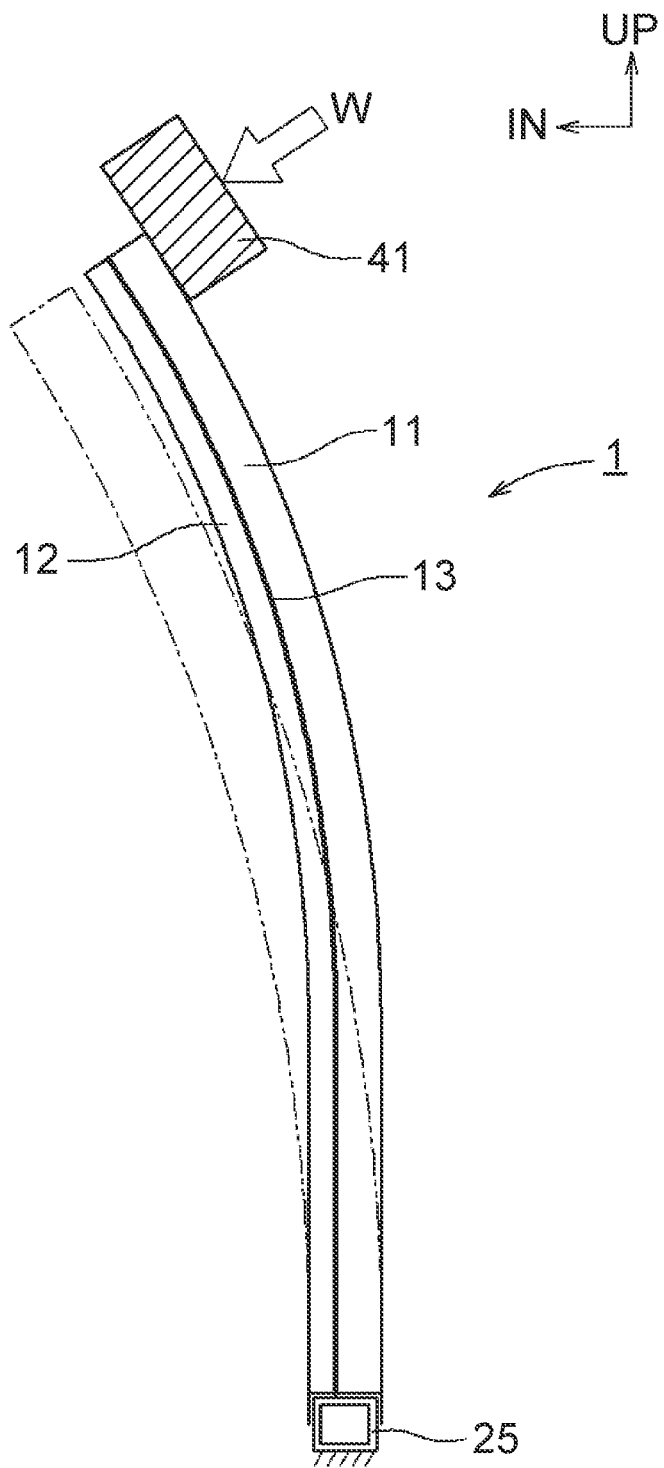
FIG. 5 is a view showing a concept of an analysis condition of a roof crush.

Next, the roof crush resistance performance of the vehicle center pillar 1 shown in FIG. 1 to FIG. 4 will be described with reference to FIG. 5 and FIG. 6. As shown in FIG. 5, the analysis condition of a roof crush is such that the lower end in the vehicle-height direction of the vehicle center pillar 1 is supported by the side sill 25, and a load W is applied via an indenter 41 onto an upper end in the vehicle-height direction of the outer panel 11, obliquely downward and inward of the vehicle-width direction. The load W is obtained by simulating a roof crush test load.

As shown in FIG. 5, when the load W is applied onto the upper end in the vehicle-height direction of the outer panel 11 via the indenter 41 obliquely downward and inward of the vehicle-width direction, respective lower portions in the vehicle-height direction of the outer panel 11, the pillar reinforcement 13, the first reinforcement 15, and the second reinforcement 16 are located on the tensile side, and the lower portion in the vehicle-height direction of the inner panel 12 is located on the compression side. When the pair of longitudinally long bead portions 35 of the inner panel 12 is buckled due to compression, for example, the vehicle center pillar 1 exhibits such a behavior that both of the longitudinally long bead portions 35 in pair inwardly come closer to each other in the vehicle front-rear direction as if the lengths of respective profile lines of the longitudinally long bead portions 35 in pair meet each other.

Figure 6:
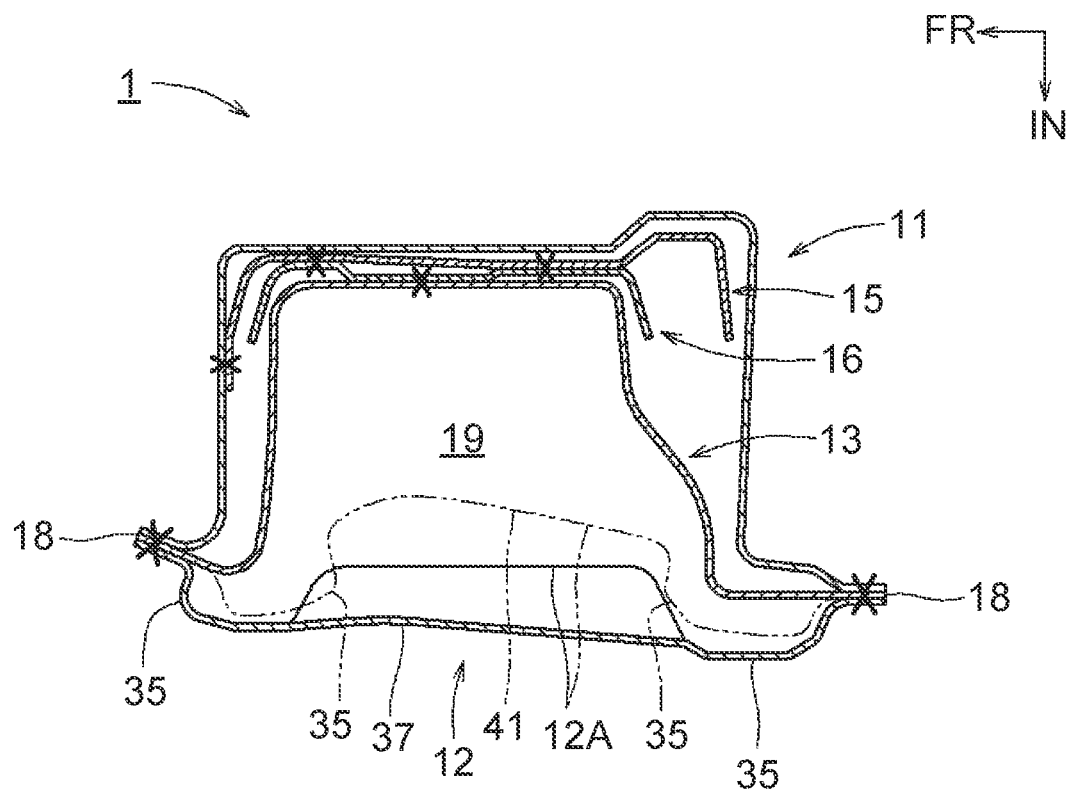
FIG. 6 is an explanatory view showing a displacement of a cross-sectional collapse in the section taken along line III-III of FIG. 1.

At this time, for example, when the inner panel 12 has no reinforcing coupling bead portion 37, for example, the base wall portion 12A of the inner panel 12 located on the compression side becomes deformed inward of the closed section 19 of the vehicle center pillar 1, as indicated by a one dot chain line in FIG. 6. Hence, there is a risk that a cross-sectional collapse might occur in the closed section 19 at the lower end portion in the vehicle-height direction of the vehicle center pillar 1 including the installation opening 27.

To cope with this, at a position above and near the installation opening 27 formed in the lower end portion in the vehicle-height direction, the inner panel 12 of the present embodiment is provided with the reinforcing coupling bead portion 37 that couples the pair of longitudinally long bead portions 35 formed at the both side edges, along the vehicle front-rear direction. Accordingly, as indicated by a solid line in FIG. 6, the effect of the reinforcing coupling bead portion 37 suppresses both of the pair of longitudinally long bead portions 35 from inwardly coming closer to each other in the vehicle front-rear direction, and also suppresses the base wall portion 12A of the inner panel 12 from being deformed toward the inner side of the closed section 19 of the vehicle center pillar 1. As a result, the cross-sectional collapse in the closed section 19 can be suppressed at the lower end portion in the vehicle-height direction of the vehicle center pillar 1 including the installation opening 27, and thus it is possible to enhance the roof crush resistance performance with a simple configuration.

Since the reinforcing coupling bead portion 37 is formed at a position above and near the installation opening 27, it is possible to avoid stress concentration at the time of a roof crush and a lateral collision of the vehicle. Therefore, it is possible to suppress the vehicle center pillar 1 from being bent and broken at a position where the reinforcing coupling bead portion 37 is formed. In addition, the vehicle center pillar 1 can embody the configuration to suppress a cross-sectional collapse in the closed section 19 of the vehicle center pillar 1 including the installation opening 27 at the time of a roof crush and a lateral collision of the vehicle, for example, without applying such a change that increases the strengths of the outer panel 11, the pillar reinforcement 13, the inner panel 12, and others by increasing their thicknesses to increase their weights, or such a change that increases strengths of the materials, which results in increase in manufacturing cost.

The vehicle center pillar of the present disclosure is not limited to the configurations, the structures, the appearances, the shapes, the processing procedures, and others that have been described in the aforementioned embodiment, and may be variously modified, improved, added, or deleted without changing the scope of the present disclosure. In the following description, the same reference numerals as those of the configurations of the vehicle center pillar 1 according to the present embodiment in FIG. 1 to FIG. 6 indicate the same or equivalent configurations as those of the vehicle center pillar 1 according to the aforementioned embodiment.

For example, a plurality of the reinforcing coupling bead portions 37 that couple the pair of longitudinally long bead portions 35 in the vehicle front-rear direction may be provided alongside each other in the vehicle-height direction, at positions above and near the installation opening 27 in the vehicle-height direction. Accordingly, the pair of longitudinally long bead portions 35 are further suppressed from coming closer to each other toward the inner side in the vehicle front-rear direction, and the base wall portion 12A of the inner panel 12 can be suppressed from being deformed toward the inner side of the closed section 19 of the vehicle center pillar 1. As a result, it is possible to suppress a cross-sectional collapse in the closed section 19 of the vehicle center pillar 1 including the installation opening 27, to thereby further enhance the roof crush resistance performance with a simple configuration.

The projecting height of the reinforcing coupling bead portion 37 relative to the base wall portion 12A located between the pair of longitudinally long bead portions 35 may not be substantially the same as the projecting heights of the pair of longitudinally long bead portions 35 from the base wall portion 12A located between the pair of longitudinally long bead portions 35. The projecting height of the reinforcing coupling bead portion 37 may be higher or lower than the heights of the longitudinally long bead portions 35. The projecting direction of the reinforcing coupling bead portion 37 relative to the base wall portion 12A located between the pair of longitudinally long bead portions 35 may be set to project in a different direction. Even if such a configuration is employed, at the time of a roof crush and a lateral collision of the vehicle, or the like, it is possible to embody the configuration to suppress a cross-sectional collapse in the closed section 19 of the vehicle center pillar 1 including the installation opening 27.

What is claimed is:

1. A center pillar comprising:
   an outer panel being elongated, located outward in a vehicle-width direction, and having a hat-like sectional shape; and
   an inner panel being elongated, located inward of the outer panel in the vehicle-width direction, and having second flange portions bent outward from both side edges of the inner panel, the second flange portions being joined, by welding, to first flange portions bent outward in a vehicle front-rear direction from both side edges of the outer panel so as to form a closed section, wherein
   the inner panel includes:
   an installation opening formed in a lower end portion in a vehicle-height direction of the inner panel, a predetermined component being housed in the closed section via the installation opening,
   a bolt hole formed in an edge portion above the installation opening in the vehicle-height direction at a central portion of the inner panel in the vehicle front-rear direction,
   a pair of longitudinally long bead portions formed at the both side edges of the inner panel so as to extend in the vehicle-height direction from an upper end portion in the vehicle-height direction of the inner panel to a peripheral edge of the installation opening, and
   reinforcing coupling bead portion formed at a position above and near the installation opening and the bolt hole in the vehicle-height direction, the reinforcing coupling bead portion coupling the pair of longitudinally long bead portions along the vehicle front-rear direction.

2. The center pillar according to claim 1, wherein the pair of longitudinally long bead portions and the reinforcing coupling bead portion project in the same direction in the vehicle-width direction.

3. The center pillar according to claim 1, wherein the bolt hole is positioned between the installation opening and the reinforcing coupling bead portion in the vehicle-height direction of the inner panel.

* * * * *

UNITED STATES PATENT AND TRADEMARK OFFICE
CERTIFICATE OF CORRECTION

PATENT NO. : 10,814,915 B2  
APPLICATION NO. : 16/291227  
DATED : October 27, 2020  
INVENTOR(S) : Yukihiro Onishi and Naoto Taniyama Page 1 of 1

It is certified that error appears in the above-identified patent and that said Letters Patent is hereby corrected as shown below:

On the Title Page

Item (72), inventor 1, city, delete "Kariya" and insert --Kariya-shi Aichi-ken--, therefor.

Item (72), inventor 2, city, delete "Kariya" and insert --Kariya-shi Aichi-ken--, therefor.

In the Claims

In Column 8, Line(s) 29, Claim 1, before "reinforcing", insert --a--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*